(12) United States Patent  
Hill et al.

(10) Patent No.: US 7,334,834 B2
(45) Date of Patent: Feb. 26, 2008

(54) TRACTOR CAB ROOF WITH INTEGRAL HVAC AIR DUCTS

(75) Inventors: Thomas Chilton Hill, Charlotte, NC (US); Paul Michael Elhardt, Evans, GA (US); Michael David Caudill, Mt. Pleasant, SC (US)

(73) Assignee: Deere & Company, Moline, IL (US)

( * ) Notice: Subject to any disclaimer, the term of this patent is extended or adjusted under 35 U.S.C. 154(b) by 40 days.

(21) Appl. No.: 11/371,723

(22) Filed: Mar. 9, 2006

(65) Prior Publication Data

US 2007/0210618 A1 Sep. 13, 2007

(51) Int. Cl.
*B62D 33/06* (2006.01)

(52) U.S. Cl. .................. 296/190.09; 296/210; 454/137

(58) Field of Classification Search ........... 296/190.09, 296/212, 210; 454/136, 137, 138
See application file for complete search history.

(56) References Cited

U.S. PATENT DOCUMENTS

| 4,088,364 A | 5/1978 | Termont .................... 296/28 C |
| 4,531,453 A | 7/1985 | Warman et al. .............. 98/2.11 |
| 4,641,502 A * | 2/1987 | Aldrich et al. ................. 62/244 |
| 4,660,462 A | 4/1987 | Thompson et al. .......... 98/2.11 |
| 5,690,549 A | 11/1997 | Webb et al. ................. 454/137 |
| 5,860,856 A | 1/1999 | Teich et al. .................. 454/158 |
| 5,913,566 A * | 6/1999 | Stauffer et al. .......... 296/190.1 |
| 5,921,619 A * | 7/1999 | Cederberg et al. ..... 296/190.09 |
| 6,279,978 B1 | 8/2001 | Schreyer et al. ........... 296/39.3 |
| 6,309,012 B1 | 10/2001 | Fryk et al. .................... 296/211 |
| 6,322,136 B2 | 11/2001 | Boyce et al. ............... 296/214 |
| 6,780,097 B2 | 8/2004 | Shuttleworth et al. ...... 454/136 |
| 2007/0044492 A1* | 3/2007 | Ichikawa et al. ............. 62/239 |
| 2007/0205633 A1* | 9/2007 | Waco et al. ........... 296/190.09 |

\* cited by examiner

*Primary Examiner*—Jason S Morrow

(57) ABSTRACT

A tractor cab roof with integral HVAC air ducts includes an upper roof member and a lower roof member. The upper roof member includes a top panel, downwardly depending side edges, and a downwardly depending rear edge. The lower roof member includes a central panel, left and right side panels below the central panel, a rear panel below the central panel, sloping side walls, and a sloping rear wall. Conditioned air ducts are between the upper roof member and the left and right side panels, with conditioned air outlet apertures in the sloping side walls. An evaporator/heater core is mounted on the rear panel, with an air mixing chamber to the rear and a conditioned air discharge cavity in front. Recirculating air intake apertures are provided where the sloping rear wall joins the rear panel. A pair of blowers move conditioned air from the conditioned air chamber into the conditioned air ducts. The flow of conditioned air crosses over the recirculating air in a figure eight pattern.

21 Claims, 6 Drawing Sheets

_US 7,334,834 B2_

TRACTOR CAB ROOF WITH INTEGRAL HVAC AIR DUCTS

FIELD OF THE INVENTION

The present invention relates generally to a roof for a tractor cab, and more specifically to air ducts in a tractor cab roof for directing heating, cooling or ventilating air within the cab.

BACKGROUND OF THE INVENTION

Work vehicles such as agricultural and industrial tractors are frequently operated in less than ideal environmental conditions. For example, tractors are operated in uncomfortably warm or cold weather, and in dusty conditions caused by the work being done by the vehicle. As a result, it is desirable to provide in the cab a system for filtering and conditioning the air. One approach has been to place the components of an HVAC system in a housing in the tractor cab roof. This may result in a cumbersome structure which does not optimize the available space and may intrude into the cab area. Additionally, the ducts, hoses, conduits, wiring and inlet and outlet vents may be positioned based upon available space rather than efficient ergonomic placement.

One approach to overcoming these disadvantages has involved the use of one piece roto-molded roof structures which have a well or compartment to receive the HVAC units and have air ducts and vents molded into the roof structure. Such attempts have created their own disadvantages. For example, roto-molded parts do not have a high degree of dimensional stability and thus present a number of fit, mount-up and aesthetic difficulties. Further, one piece designs present less cost effective servicing access.

A two-piece vehicle roof structure having an integrated HVAC system is shown in U.S. Pat. No. 6,780,097. The lower roof member has contours and apertures for components of an HVAC system, and define air passages. In the two-piece vehicle roof structure described in the above patent, air intake apertures are located at the outer periphery of the lower roof member, on the left and right sides. Additionally, conditioned air vents are positioned on the left and right sides of the lower roof member, spaced inwardly from the intakes. Partition walls along the left and right sides of the lower roof member separate the unconditioned air ducts from the conditioned air ducts, and ensure that unconditioned air is passed through, rather than around, the HVAC core. The upper roof member encloses the unconditioned air ducts and the core chamber, and duct covers also may enclose the conditioned air ducts.

There is a need for a tractor roof structure with HVAC ducts having smaller space requirements than the two-piece vehicle roof structure described above. There is a need for a tractor roof structure with HVAC ducts that is low in cost, requires few components, and minimizes the use of separate divider walls.

SUMMARY OF THE INVENTION

The present invention provides a tractor cab roof containing integral air ducts for an HVAC system. The lower and upper roof members provide surfaces used as ducts for conditioned air and recirculating air, minimizing space requirements and reducing the need for divider walls. Fresh air from outside the tractor cab may enter through a filter located behind a rear mounted evaporator/heater core. Air recirculated from the tractor cab may be combined with fresh filtered air in an air mixing chamber just upstream of the evaporator/heater core. The tractor cab roof with integral air ducts provides a compact, space efficient and functional way of controlling air flow by using the roof surfaces, and minimizes the use of separate divider walls.

DESCRIPTION OF THE PREFERRED EMBODIMENTS

Figure 1:
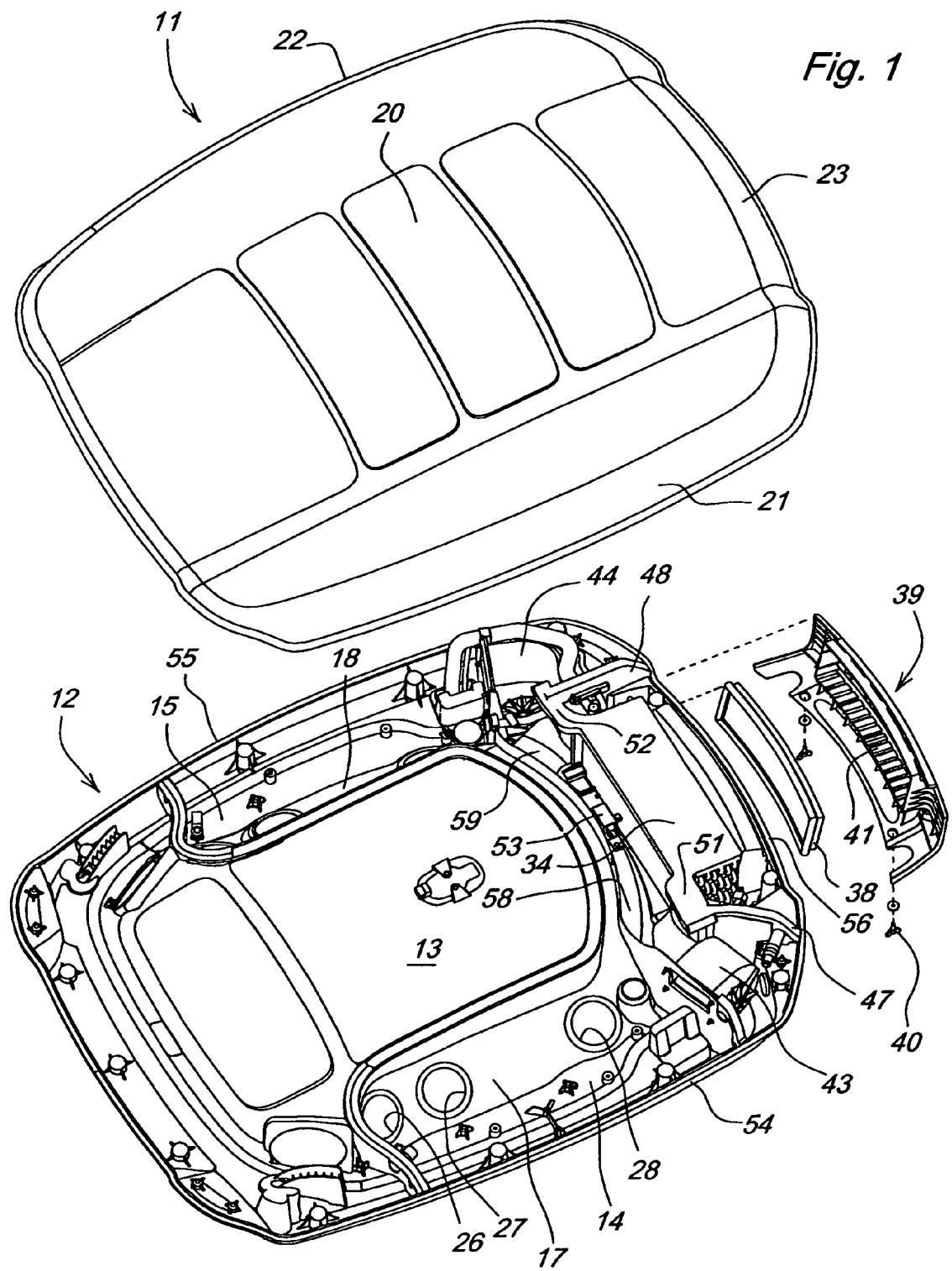
FIG. 1 is an exploded perspective view of a tractor cab roof with integral HVAC air ducts according to a first embodiment of the invention.

In FIG. 1 of the drawings, a first embodiment of a tractor cab roof with integral HVAC air ducts is shown. The tractor cab roof includes upper roof member 11 and lower roof member 12. The upper and lower roof geometries may provide integral ducts that minimize space requirements and the need for extra ducts.

Figure 2:
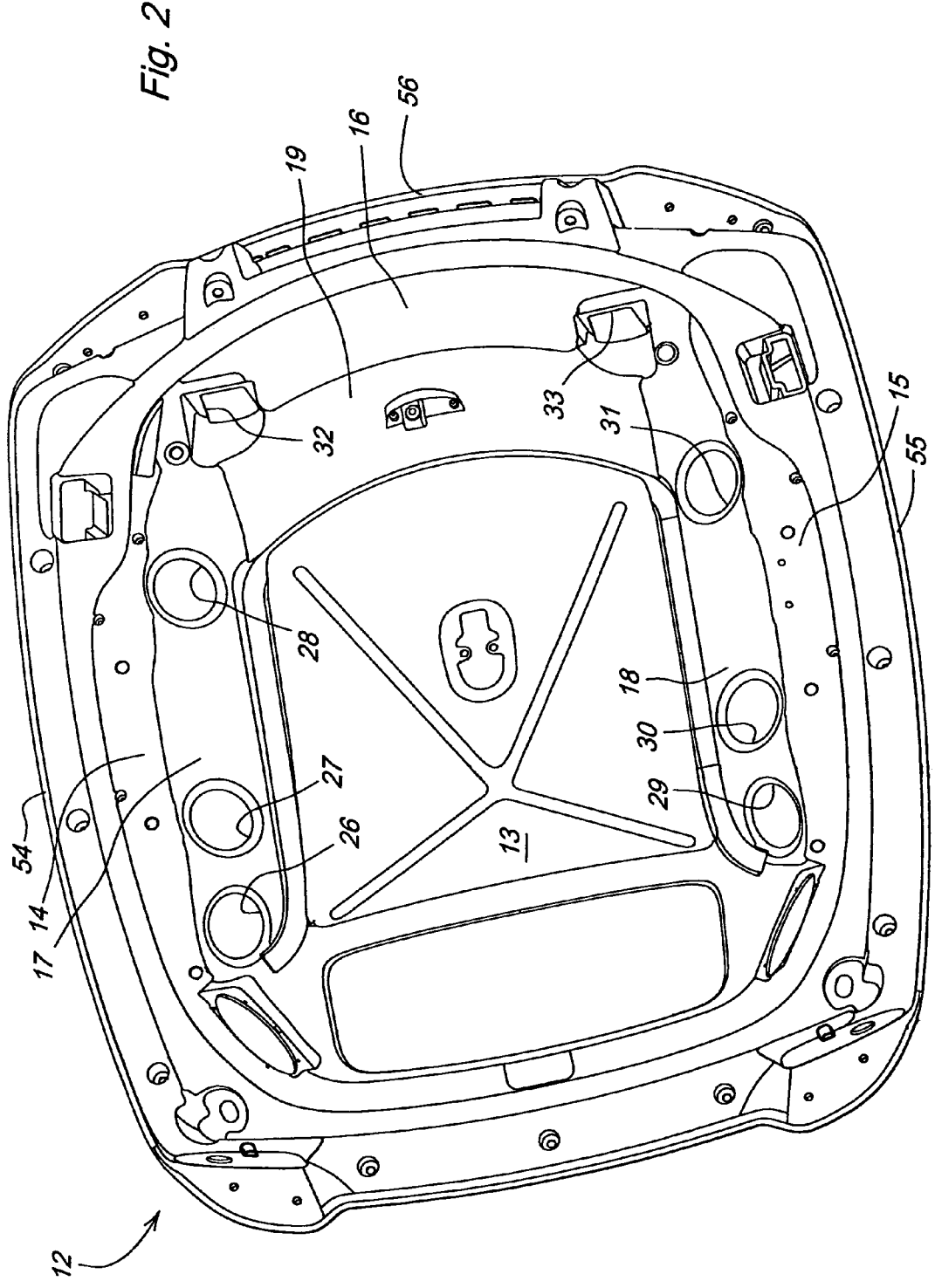
FIG. 2 is a bottom view of the lower roof member of a tractor cab roof according to a first embodiment of the invention.

In one embodiment, upper roof member 11 may have a horizontal top panel 20 with downwardly depending side edges 21, 22 on its left and right sides, and a downwardly depending rear edge 23. As shown in FIGS. 1 and 2, lower roof member 12 may include central panel 13, left and right side panels 14, 15, and rear panel 16, which together form a unitary, integral structure. Central panel 13, left and right side panels 14, 15, and rear panel 16 may lie in generally horizontal planes, or within about ten degrees plus or minus from horizontal planes. When upper roof member 11 is mounted to lower roof member 12, top panel 20 of the upper roof member may be separated and spaced vertically from side panels 14, 15 and rear panel 16 of the lower roof member, most preferably being separated by between about two inches and about 12 inches. Each of left and right side panels 14, 15 may have a lateral width of between about three inches and about ten inches. Sloping side walls 17, 18 may extend between central panel 13 and each side panel 14, 15, and sloping rear wall 19 may extend between central panel 13 and rear panel 16, to form a passage or duct.

Figure 3:
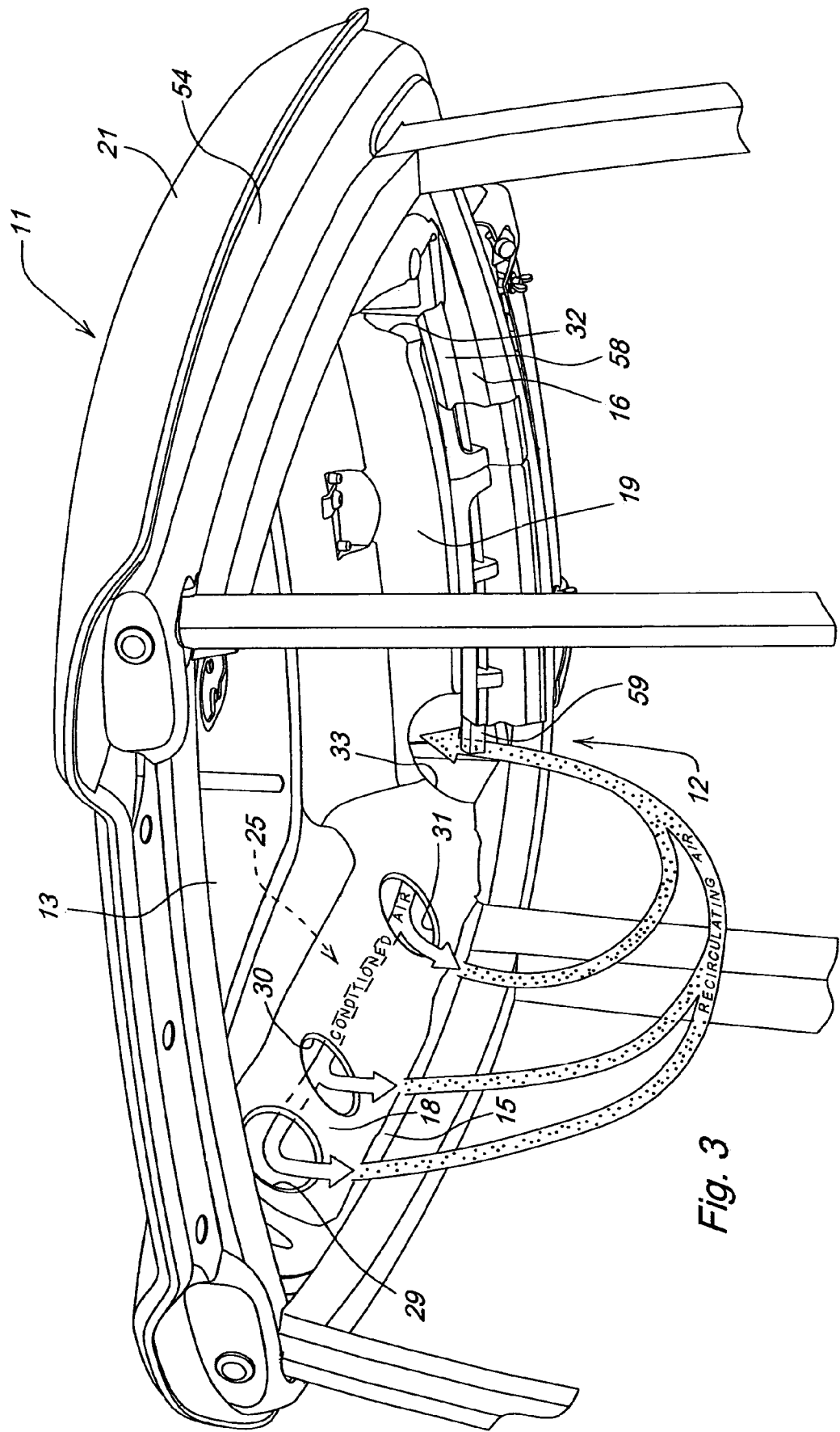
FIG. 3 is a front perspective view of the underside of a tractor cab roof according to a first embodiment of the invention.
Figure 4:
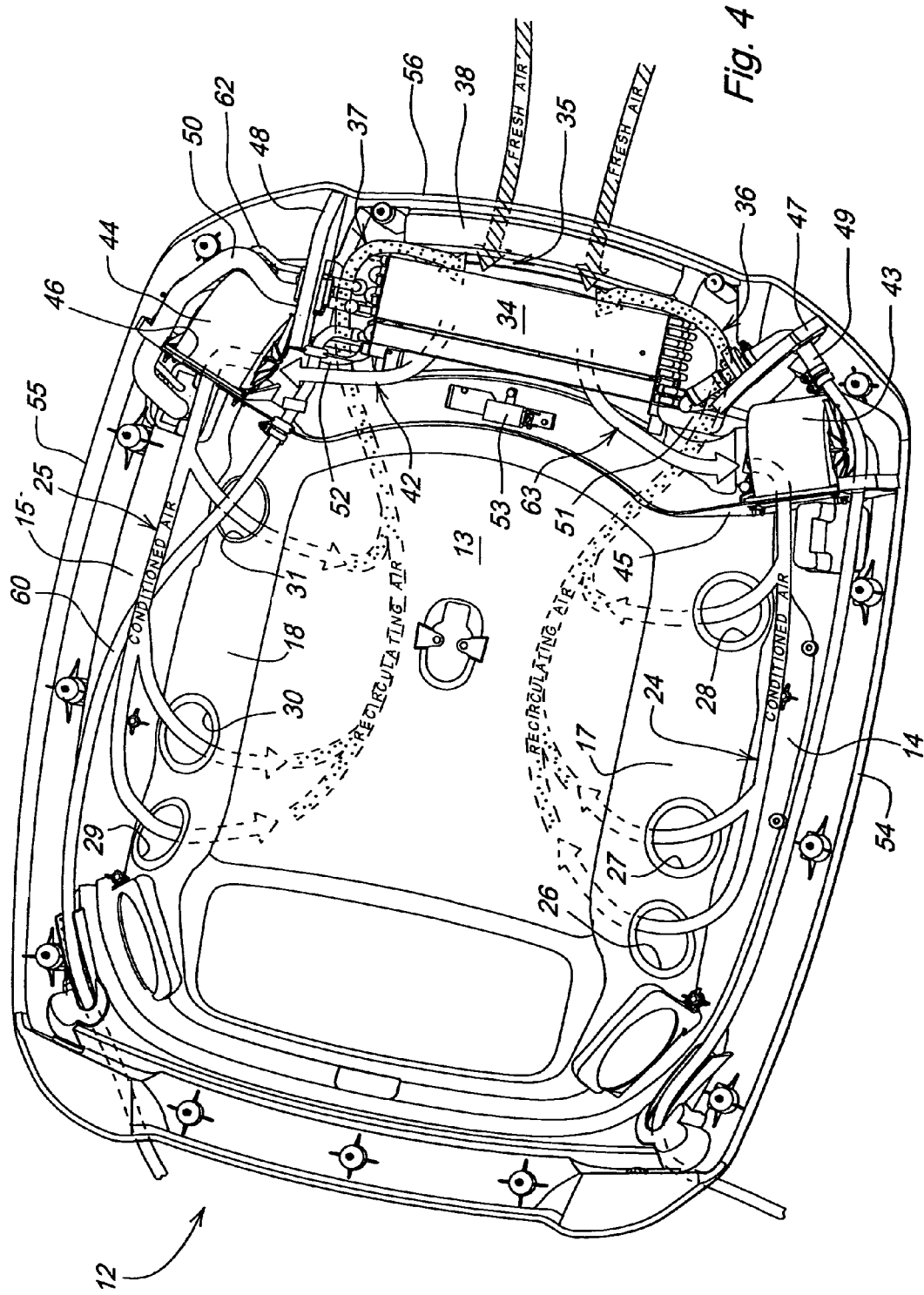
FIG. 4 is a top view of a lower roof member of a tractor cab roof showing the flow pattern of conditioned and recirculating air through the integral HVAC air ducts according to a first embodiment of the invention.
Figure 5:
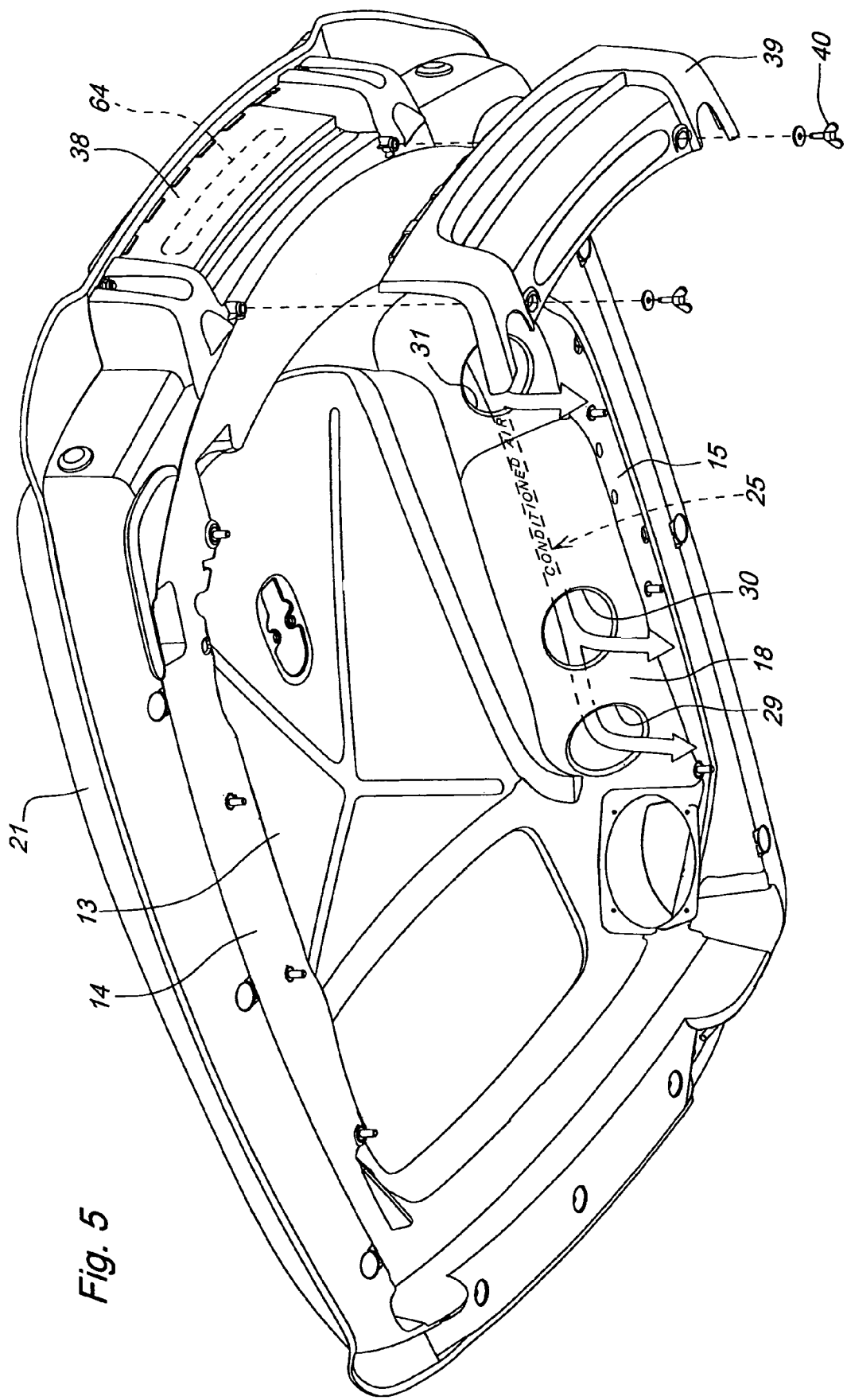
FIG. 5 is a rear perspective view, partially exploded, of the tractor cab roof with integral HVAC air ducts according to a first embodiment of the invention.

In one embodiment, as shown in FIGS. 1, 3 and 4, left and right side edges 21, 22 of upper roof member 11 may be joined to left and right side edges 54, 55 at the outer perimeter of lower roof member 12, and rear edge 23 of upper roof member 11 may be joined to rear edge 56 of lower roof member 12 at its outer perimeter. The assembled roof structure provides a pair of conditioned air ducts 24, 25 between the upper and lower roof members. Conditioned air duct 24 is enclosed on its top and bottom by top panel 20 and side panel 14, and on its sides by side edge 21 of the upper roof member, and sloping side wall 17 of the lower roof member. Conditioned air duct 25 is enclosed on its top and bottom by top panel 20 and side panel 15, and on its sides by side edge 22 of the upper roof member, and sloping side wall 18 of the lower roof member.

In one embodiment, the upper roof member may be formed of a sheet molding compound (SMC) and the lower roof member may be compression molded.

In one embodiment, the outer perimeter 54, 55, 56 of lower roof member 12 may act as a condensate dam to prevent condensate water from entering the cab area. Air conditioner suction line 50 between the upper and lower roof members may be wrapped in foam insulation which may capture the condensate and direct it along the tube to an opening through which the line exits the roof. Hot water supply hose 49, warm water return hose 60, and air conditioning liquid line 62 also may be routed between the upper and lower roof members. Most condensate water developed by the system may be collected underneath evaporator 34 and drained to drain tubes in the back of the roof.

In one embodiment, conditioned air duct 24 on the left side of the roof structure and conditioned air duct 25 on the right of the roof structure are created by and between the upper and lower roof members. Each conditioned air duct 24, 25 may extend fully between the top panel of the upper roof member and each side panel of the lower roof member, and provides a passage for conditioned air to flow to conditioned air outlet apertures 26-28 in sloping side wall 17, and to conditioned outlet apertures 29-31 in sloping side wall 18. Conditioned air may be blown through conditioned air outlet apertures 26-28 and 29-31 into the cab. Conditioned air ducts 24, 25 are integral with upper roof member 11 and lower roof member 12 and do not use any divider walls between the upper and lower roof members.

In one embodiment, as shown in FIG. 3, recirculating air intake apertures 32, 33 may be located at each of the rear corners of sloping rear wall 19 where it joins rear panel 16. Recirculating air intake apertures 32, 33 may intake recirculating air from the cab to be cooled or heated by evaporator/heater core 34. Before entering recirculating air intake apertures 32, 33, recirculated air may be filtered with accessible reticulated foam filters 58, 59 located behind the operator's head.

Figure 6:
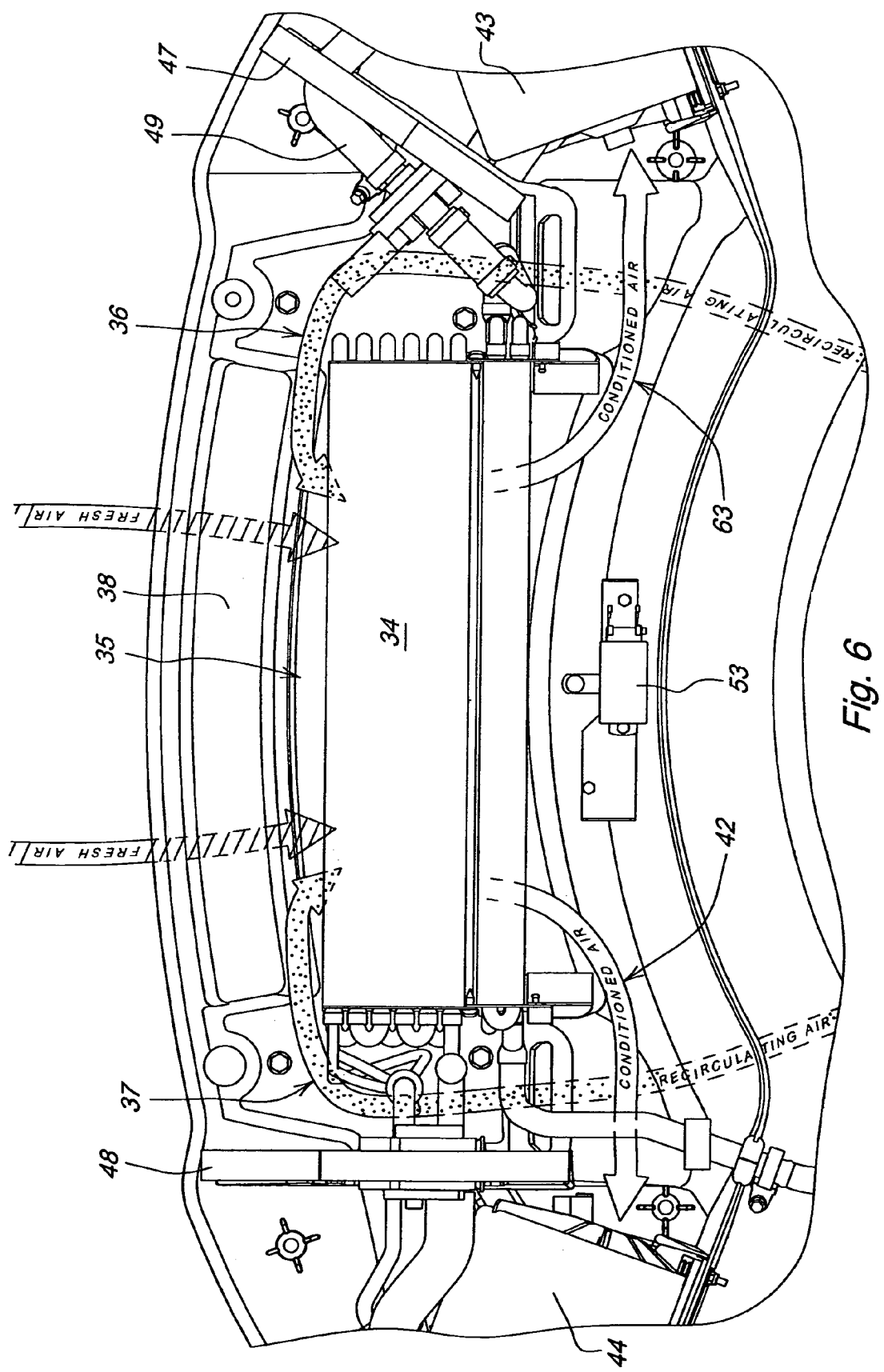
FIG. 6 is a top view of a portion of the tractor cab roof showing the flow pattern of conditioned and recirculating air according to a first embodiment of the invention.

In one embodiment, shown in FIGS. 4 and 6, evaporator/heater core 34 may be positioned on rear panel 16 of lower roof member 12. The evaporator/heater core may be copper tube plate fin (CTPF) heat exchangers. Recirculating air passages 36, 37 on the left and right sides of evaporator/heater core 34 may allow flow of recirculating air from recirculating air intake apertures 32, 33 to air mixing chamber 35. Air mixing chamber 35 may be between fresh air filter 38 and evaporator/heater core 34, directly behind and just upstream of the evaporator/heater core. Air mixing chamber 35 provides a cavity for fresh air and recirculating air to mix before entering evaporator/heater core 34.

In one embodiment, fresh air from outside the cab may enter the HVAC system in the tractor cab roof though fresh air filter 38 located behind rear mounted evaporator/heater core 34, and then through passage 64 to air mixing chamber 35. Air recirculated from the tractor cab may be combined with fresh filtered air just upstream of the evaporator/heater core. Fresh air filter 38 may be removably mounted adjacent air mixing chamber 35, upstream of evaporator/heater core 34. Cartridge 39 may hold fresh air filter 38 in a mounted position, and may be removed and replaced manually to the rear of the roof assembly using fasteners 40. Air from outside the cab may enter underneath cartridge 39, through gaps or ribs 41 molded into the underside of the cartridge body.

In one embodiment, conditioned air may exit evaporator/heater core 34 to conditioned air discharge cavities 42, 63 in front of and downstream from the evaporator/heater core. The conditioned air discharge cavities may be integral with the cab roof structure and may be enclosed between sloping rear wall 19 of the lower roof member and the evaporator/heater core. Blowers or fans 43, 44 may be positioned at the outer lateral sides of conditioned air discharge cavities 42, 63. Blowers 43, 44 may be mounted in walls 45, 46 extending between the upper and lower roof members. Each blower 43, 44 may move conditioned air through conditioned air ducts 24, 25 along the left and right sides of the cab roof between the upper and lower roof members, and out through conditioned air outlet apertures 26-28 and 29-31 into the cab. Foam insulation may be attached to upper roof member 11 above conditioned air ducts 24, 25.

In one embodiment, a pair of divider walls 47, 48 may be positioned between air mixing chamber 35 and each of conditioned air discharge cavities 42, 63, to separate recirculating air from conditioned air. Divider walls 47, 48 may have a length of between about two inches and about eight inches between flanges 51, 52 on the left and right sides of the evaporator/heater core and downwardly depending rear edge 23 at the perimeter of the roof structure, and a height of between about two inches and about eight inches to extend vertically between the rear panel of the lower roof member and the upper roof member 11. Divider wails 47, 48 may be flexible, resilient material having a wall thickness of between about ¼ inch and about one inch. Hot water supply hose 49, air conditioning suction line 50, and air conditioning liquid line 62 may extend through sealed apertures in divider walls 47, 48. Evaporator/heater core 34 may have flanges 51, 52 extending laterally from its left and right sides. Thermostat control 53 may control the operation of the HVAC system and may be positioned in conditioned air discharge cavity or chamber 42 in front of and downstream of evaporator/heater core 34.

As shown in FIG. 4, conditioned and recirculating air may flow in mirrored figure eight patterns through the integral HVAC air ducts and tractor cab. Conditioned air may exit through conditioned air outlet apertures 26-28 and 29-31 into the cab, and then may be recirculated by entering recirculating air intake apertures 32, 33. Recirculating air then may flow through recirculating air passages 36, 37 around the sides of evaporator/heater core 34 to air mixing chamber 35. Conditioned air exiting the evaporator/heater core may enter air discharge cavities 42, 63, and then through blowers 43, 44 to conditioned air ducts 24, 25. Conditioned air then may exit conditioned air ducts 24, 25 through conditioned air outlet apertures 26-28 and 29-31.

In one embodiment, lower roof member 12 and divider walls 47, 48 may provide barriers that separate conditioned air from recirculating air where their flow paths cross. For example, recirculating air may flow rearwardly toward evaporator/heater core 34 in a path that crosses under the path of conditioned air flowing forward toward conditioned air ducts 24, 25.

Having described the preferred embodiment, it will become apparent that various modifications can be made without departing from the scope of the invention as defined in the accompanying claims.

The invention claimed is:

1. A tractor cab roof comprising:
   an upper roof member and a lower roof member, the lower roof member having a central panel, left and right side panels below the central panel, and a rear panel which together form an integral structure, and sloping side walls between the central panel and the left and right side panels;
   conditioned air ducts between the left and right side panels of the lower roof member and the upper roof member;
   conditioned air outlet apertures in the sloping side walls; and
   recirculating air intake apertures between the rear panel and the left and right side panels.

2. The tractor cab roof of claim 1 further comprising an evaporator/heater core mounted on the rear panel.

3. The tractor cab roof of claim 2 further comprising an air mixing chamber for mixing recirculating air and fresh air to the rear and upstream of the evaporator/heater core.

4. The tractor cab roof of claim 3 further comprising divider walls enclosing the air mixing chamber.

5. The tractor cab roof of claim 3 further comprising a removable air filter positioned behind the air mixing chamber.

6. The tractor cab roof of claim 5 further comprising a removable cartridge over the removable air filter and providing a passage for entry of fresh outside air.

7. The tractor cab roof of claim 1 wherein the upper roof member has downwardly depending edges on the left and right sides.

8. The tractor cab roof of claim 1 wherein the recirculating air and the conditioned air flow in figure eight patterns.

9. A tractor cab roof with integral HVAC air ducts comprising:
   a pair of conditioned air ducts between a lower roof member and an upper roof member of the tractor cab roof;
   a plurality of conditioned air outlet apertures in the lower roof member;
   a pair of recirculating air intake apertures in the lower roof member;
   a recirculating air duct between the recirculating air intake aperture and an air mixing chamber adjacent an evaporator/heater core;
   a conditioned air discharge cavity adjacent the evaporator/heater core; and
   a pair of blowers between the conditioned air discharge cavity and the conditioned air ducts.

10. The tractor cab roof with integral HVAC air ducts of claim 9 further comprising a fresh air filter behind the evaporator/heater core.

11. The tractor cab roof with integral HVAC air ducts of claim 9 wherein the lower roof member includes a central panel, left and right side panels, and a rear panel, all of which form an integral one-piece structure.

12. The tractor cab roof with integral HVAC ducts of claim 11 further comprising sloping side walls between the central panel and the left and right side panels, and a sloping rear wall between the central panel and the rear panel.

13. The tractor cab roof with integral HVAC air ducts of claim 9 wherein the upper roof member includes a top panel with downwardly depending side edges and a downwardly depending rear edge joined to the lower roof member.

14. The tractor cab roof with integral HVAC air ducts of claim 9 wherein the flow of recirculating air toward the evaporator/heater core crosses under the air flow of conditioned air out from the evaporator/heater core.

15. A tractor cab roof comprising:
   an upper roof member with a top panel, downwardly depending side edges on a left side and a right side of the top panel, and a downwardly depending rear edge on the rear of the top panel;
   a lower roof member with a central panel, left and right side panels below the central panel, a rear panel below the central panel, sloping side walls between the central panel and the left and right side panels, and a sloping rear wall between the central panel and the rear panel;
   conditioned air ducts between the upper roof member and each of the left and right side panels, and a plurality of conditioned air outlet apertures in the sloping side walls;
   an evaporator/heater core mounted on the rear panel, with an air mixing chamber to the rear of the evaporator/heater core and a conditioned air discharge cavity to the front of the evaporator/heater core;
   a pair of recirculating air intake apertures where the sloping rear wall joins the rear panel; and
   at least one blower moving conditioned air from the conditioned air discharge cavity into the conditioned air ducts.

16. The tractor cab roof of claim 15 further comprising at least one flexible divider between the air mixing chamber and the conditioned air discharge cavity.

17. The tractor cab roof of claim 15 further comprising an air filter with a cartridge removably mounted adjacent the evaporator/heater core.

18. The tractor cab roof of claim 17 wherein the air mixing chamber receives recirculating air from the recirculating air intake apertures and outside air filtered through the air filter.

19. The tractor cab roof of claim 15 wherein the recirculating air and conditioned air flows in a figure eight pattern through the recirculating air intake apertures, conditioned air ducts and cab.

20. The tractor cab roof of claim 15 wherein the air mixing chamber is between the downwardly depending rear edge of the top member, the fresh air filter, and the evaporator/heater core.

21. The tractor cab roof of claim 15 wherein the conditioned air discharge cavity is between the sloping rear wall of the lower roof member and the evaporator/heater core.

* * * * *